United States Patent [19]
Buttle et al.

[11] Patent Number: 5,148,427
[45] Date of Patent: Sep. 15, 1992

[54] NON-LINEAR ECHO CANCELLER

[75] Inventors: Kenneth G. Buttle, Orangevale; Hiroshi Takatori, Sacramento, both of Calif.

[73] Assignee: Level One Communications, Inc., Folsom, Calif.

[21] Appl. No.: 507,595

[22] Filed: Apr. 10, 1990

[51] Int. Cl.$^5$ ............................................. H04B 3/23
[52] U.S. Cl. .................................... 370/32.1; 379/411
[58] Field of Search ................. 370/32.1, 32; 379/410, 379/411, 406

[56] References Cited

U.S. PATENT DOCUMENTS

| | | |
|---|---|---|
| 3,792,356 | 2/1974 | Kobayashi et al. |
| 4,170,758 | 10/1979 | Tamburelli |
| 4,270,179 | 5/1981 | Sifford et al. |
| 4,283,788 | 8/1981 | Tamburelli |
| 4,412,341 | 10/1983 | Gersho et al. |
| 4,468,786 | 8/1984 | Davis |
| 4,520,489 | 5/1985 | Hogge, Jr. |
| 4,583,234 | 4/1986 | Ramadan |
| 4,669,116 | 5/1987 | Agazzi et al. ............ 379/411 |
| 4,760,596 | 7/1988 | Agrawal et al. |
| 4,789,994 | 12/1988 | Randall et al. |
| 4,852,090 | 7/1989 | Borth |
| 4,937,813 | 6/1990 | Schenk ............... 370/32.1 |
| 4,977,591 | 12/1990 | Chen et al. ........... 370/32.1 |

OTHER PUBLICATIONS

IEEE Journal on Selected Areas in Communications, Mar., 1984 vol. SAC-2, No. 2, pp. 314-323, Piet J. Van Gerwen, "Design Considerations for a 144 kbit/s Digital Transmission Unit for the Local Telephone Network".

IEEE Transactions on Communications, Nov., 1982, vol COM-30, No. 11, pp. 2421-2433, O. Agazzi, D. Messerschmitt, & D. Hodges, "Nonlinear Echo Cancellation of Data Signals".

IEEE Transactions on Communications, Sep. 1976, vol. COM-24, No. 9, pp. 956-962, Kurt H. Mueller "A New Digital Echo Canceler for Two-Wire Full-Duplex Data Transmission".

IEEE Transactions on Circuits and Systems, Mar., 1987, vol. CAS-34 No. 3, pp. 225-232, Ernst G. Peter, "Multistage RAM: An FIR Filter for Echo Cancellation in a Digital Two-Wire Subscriber Loop".

Primary Examiner—Douglas W. Olms
Assistant Examiner—Alpus H. Hsu
Attorney, Agent, or Firm—Merchant, Gould, Smith, Edell, Welter & Schmidt

[57] ABSTRACT

A method and apparatus for echo cancelling linear and nonlinear echo components from a received signal by temporally and spatially separating the overall echo canceller into a fast, transversal filter based linear echo canceller which quickly cancels the linear echoes and a slow, look-up table based nonlinear echo canceller which cancels the nonlinear echo components.

17 Claims, 7 Drawing Sheets

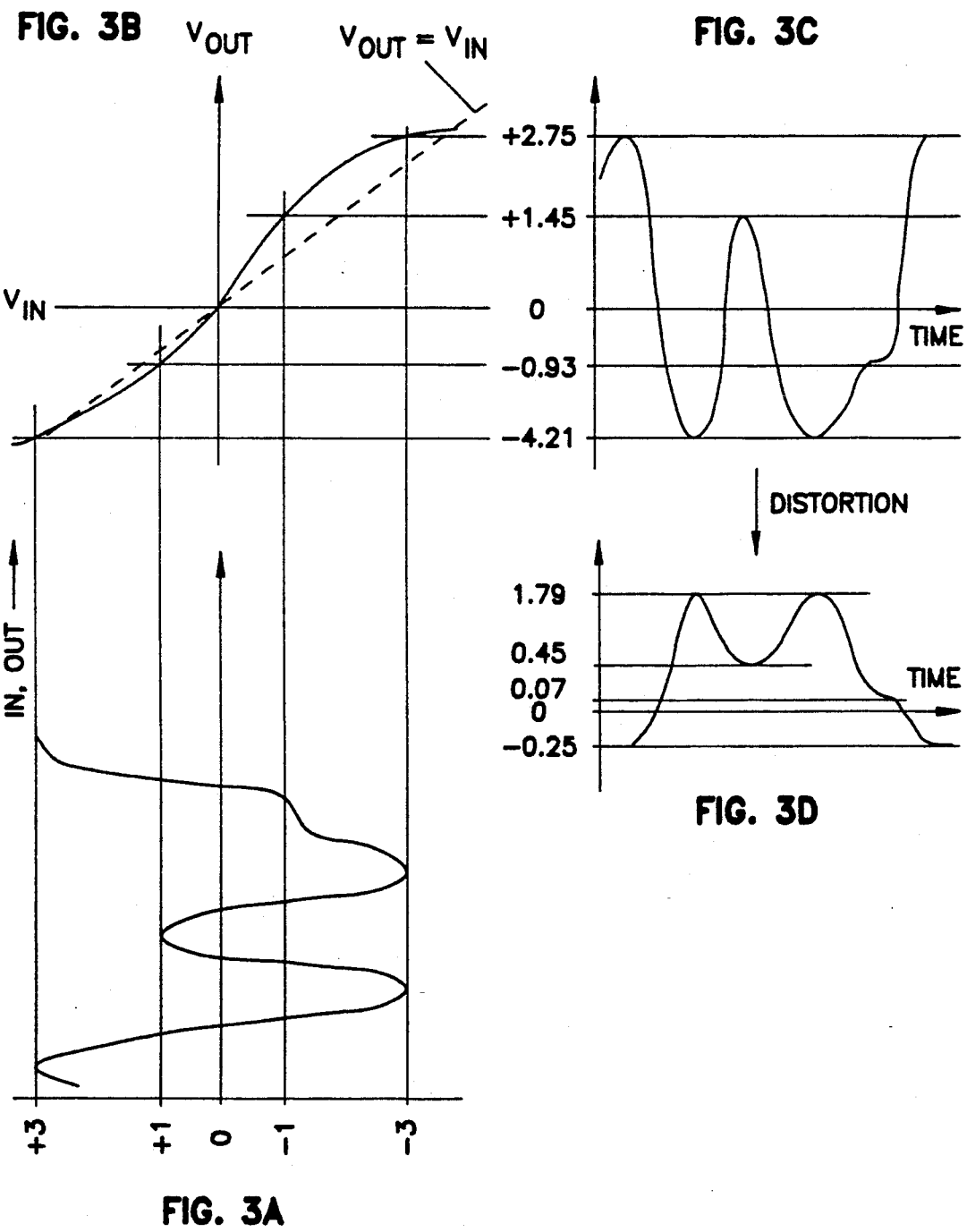

NON-LINEAR ECHO CANCELLER

BACKGROUND OF THE INVENTION

1. Field of the Invention

The present invention relates generally to the field of electronic filters. In particular, the present invention relates to an echo canceller with the ability to cancel the echo response caused by non-linearities. While the present invention has numerous other applications, it will be described in relation to its application in an integrated services digital network (ISDN) system.

2. Background Information

The telephone system has expanded to such a degree that today it is possible for almost anybody to have almost instantaneous communications with almost anybody else almost anywhere in the world. Since the phone system is so ubiquitous, it provides a desirable communication medium for more than just voice-to-voice communication. Additional services such as facsimile transfers, telemail, electronic funds transfer, video data, computers links, and alarm systems benefit from the use of the telephone system.

Using the existing telephone system as a communication channel for the additional services involves more than just connecting a machine to a phone line. For example, the existing phone system was only designed to transmit analog signals with a bandwidth of about 300-3500 hertz, sufficient for voice communication but not optimum for the additional services which generally transmit data having significantly higher frequency components. The result is that the signals of the additional services distort as they propagate.

Aggravating the problem of using the present system is the fact that only a single twisted pair of wires interconnect a subscriber (user) with a central office. This means that the subscriber's transmitter (mouthpiece) and receiver (earpiece) share the same two wires. While this is a low cost method of connecting subscribers to a central office, because full duplex (simultaneous two-way) operation is desired, cancellation of a subscriber's transmission from his own receiver is required. This is understood by considering that if a first and second subscriber both transmit at the same time, the second subscriber's signal attenuates as it travels toward the first subscriber. If the first subscriber does not cancel out of his receiver his own transmission he will hear only his own transmission and not the desired, attenuated second subscriber's signal.

Full duplex operation on two wires therefore requires that a transmitted signal must be reduced sufficiently from the transmitter's own receiver to allow reception of an incoming signal. While readily accomplishable with voice communication, it is much harder to do with the additional services because those services are more sensitive to incompletely cancelled signals.

Exacerbating the problem of increased sensitivity to incompletely cancelled signals are the numerous wire taps, wire gauge changes, and switching networks which cause signal "reflections" in the present phone system. These reflections can be picked up by the transmitter's receiver and, if not handled properly, could be mistaken for a signal from another subscriber.

Even further complicating the use of the present phone system as a communication medium is that the present phone lines have widely variable transmission line characteristics. This creates a problem because any mismatch between the telephone line and the service using the phone line causes an "incident" signal that is reflected into the receiver.

Even the manner of transmitting digital data on a phone line can create problems. For example, when the digital data is converted to a form suitable for transmission on the phone line, errors in conversion may be amplitude sensitive in a nonlinear manner. Other sources of nonlinear error are described below.

Adding together the reflections, incident signals, and nonlinearities, one obtains the "transhybrid response." The transhybrid response is then the complete echo response verses time caused by a transmitted signal. The transhybrid response has components which are linear functions of the transmitted signal, these will be referred to as linear echoes and components which are nonlinear functions of the transmitted signal, which will be referred to as nonlinear echoes.

The effects of insufficient transmission cancellation, line taps, mismatches, high frequency, and nonlinearities are very serious. To assist in dealing with these and other problems, the Accredited Standards Committee on Telecommunications, T1, submitted to the American National Standards Institute a standard for integrated networking, ANSI T1.601-1988, entitled "Integrated Services Digital Network (ISDN)—Basic Access Interface for Use on Metallic Loops for Application on the Network Side of the NT (Layer 1 Specification)." This document describes a set of requirements and protocols for digital communication when using full duplex operation on the existing single twisted wire pair phone line.

A signal transmitted on a phone line may become attenuated by as much as 40 db (100 times), making a 5/6 volt transmit signal only about 0.0085 volts at the receiver. Since an echo may be almost as large as a transmit signal, or up to about 2.5 volts, a receiver may be required to detect a 0.0085 volt signal riding on a 2.5 volt echo. Reduction of the echo amplitude to an acceptable amount is the job of the echo canceller.

While the echo canceller must reduce the echo to an acceptable amount (roughly a 60 db reduction), the actual transhybrid response is unknown until the lines connecting the subscribers is established, something that does not occur until a call is answered. Therefore, acceptable methods of echo cancelling must be adaptive, i.e. they must adjust to the line conditions existing at the time of the call.

One commonly used method of echo cancelling was proposed by Kurt H. Mueller in "A New Digital Echo Canceller for Two-Wire Full-Duplex Data Transmission" found in the *IEEE Transactions on Communications*, Sep. 1976, at pp. 956-962. Mr. Mueller proposed using a transversal filter to eliminate the transhybrid response by adjusting the filter's output to cancel the response. An improved transversal filter based echo canceller was described in co-pending U.S. Pat. application No. 07/593, filed Apr. 10, 1990 assigned to the assignee of the present application and is hereby incorporated by reference.

A problem with transversal filter based echo cancelers is that they are ineffective against echo components caused by nonlinearities. This was noted by Mr. Ernst G. Peter in "Multistage RAM: An FIR Filter for Echo Cancellation in a Digital Two-Wire Subscriber Loop" given in the *IEEE Transactions on Circuits and Systems*, vol 34 no. 3 Mar. 1987, page 225-232. Several sources of these nonlinearities were given by Agazzi, Messerschmitt, and Hodges in "Nonlinear Echo Cancellation of Data Signals" in *IEEE Transactions on Communications*, vol 30, no. 11, Nov. 1982. These sources included nonlinearities existing in A/D or D/A converters, unsymmetric transmitted signals, and transformer hysteresis and saturation.

Eliminating nonlinear echoes is complicated by the fact that the echo levels tend to be complex functions of the transmitted signal's amplitude. Mr. Ernest G. Peter, in his above mentioned article, indicated that one method of reducing nonlinear echoes was to use the "Look-up table" approach.

In the Look-up table approach all possible combinations of the previous N bauds of transmitted data are stored in a random access memory (RAM) look-up table. Each possible combination is then given its own cancellation magnitude which is used to cancel the signal whenever that pattern occurs. While the look-up table approach can reduce nonlinear echoes, it has the serious drawbacks of a slow operating time and requiring a large amount of memory when N gets large.

Agazzi, Messerschmitt, and Hodges in "Nonlinear Echo Cancellation of Data Signals" in *IEEE Transactions on Communications*, vol 30, no. 11, Nov. 1982 presented an algorithm which suggested an echo canceller having the characteristics of a look-up table approach but without requiring an excessive amount of memory. The possibility of spatially separate linear and nonlinear echo cancelers is specifically suggested in the text. However, Agazzi, Messerschmitt, and Hodges do not address how the separate echo cancelers could operate together when it is possible that one echo canceller could adjust its output in the opposite manner of the other canceller, thus causing problems of convergence.

It is therefore useful and desirable to reliably reduce both linear and nonlinear echoes in an adaptive fashion without using an excessive amount of memory or without requiring excessive time for the canceller to operate.

SUMMARY OF THE INVENTION

Accordingly, it is an object of the present invention to provide a method and apparatus for echo cancelling both linear and nonlinear echo components adaptively, quickly, and with reduced memory requirements.

In order to achieve the foregoing and other types of objects an apparatus for echo cancelling linear and nonlinear echo components, caused by a transmitted signal derived from a digital transmit pattern, from a received signal, the apparatus including: a summation network for finding the difference between calculated echo information and the received signal and for providing an error signal proportional to the difference; a linear echo canceller responsive to the error signal and for providing linear error information proportional to the uncancelled linear component in the error signal; a nonlinear echo canceller responsive to the error signal and for providing, after the linear echo canceller has provided the linear error information, nonlinear error information proportional to the uncancelled nonlinear component in the error signal; and an adder network for adding together the linear error information and the nonlinear error information and for outputting the result as the calculated echo information.

According to the instant invention a method of echo cancelling from the received signal linear and nonlinear echo components caused by a transmitted signal comprising the steps of: determining the difference between calculated echo information and the received signal and providing the result as an error signal; deriving the uncancelled linear component remaining in the error signal and providing the result error as linear error information; deriving the nonlinear echo component remaining in the error signal after the linear error information has been calculated and providing the result as nonlinear error information; and adding together the linear error information and the nonlinear error information to determine the calculated echo information.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 2A represents a typical transmitted signal.

FIG. 2B shows a typical transhybrid response resulting from the transmitted data in FIG. 2A.

FIG. 2C shows the transhybrid response of FIG. 2B with an expanded time scale.

FIGS. 3A–3D show waveform representations of the cause of a nonlinearity induced echo component and the resulting nonlinear echo.

FIG. 3A represents a typical 5 baud period transmission pattern using the ISDN protocol.

FIG. 3B shows a typical voltage-level dependant transfer curve of the transmission.

FIG. 3C is the effective transmitted signal pattern showing the effects of any nonlinearity in the transmission path.

FIG. 3D represents a typical nonlinear echo component.

DESCRIPTION OF THE PREFERRED EMBODIMENT

Figure 1:
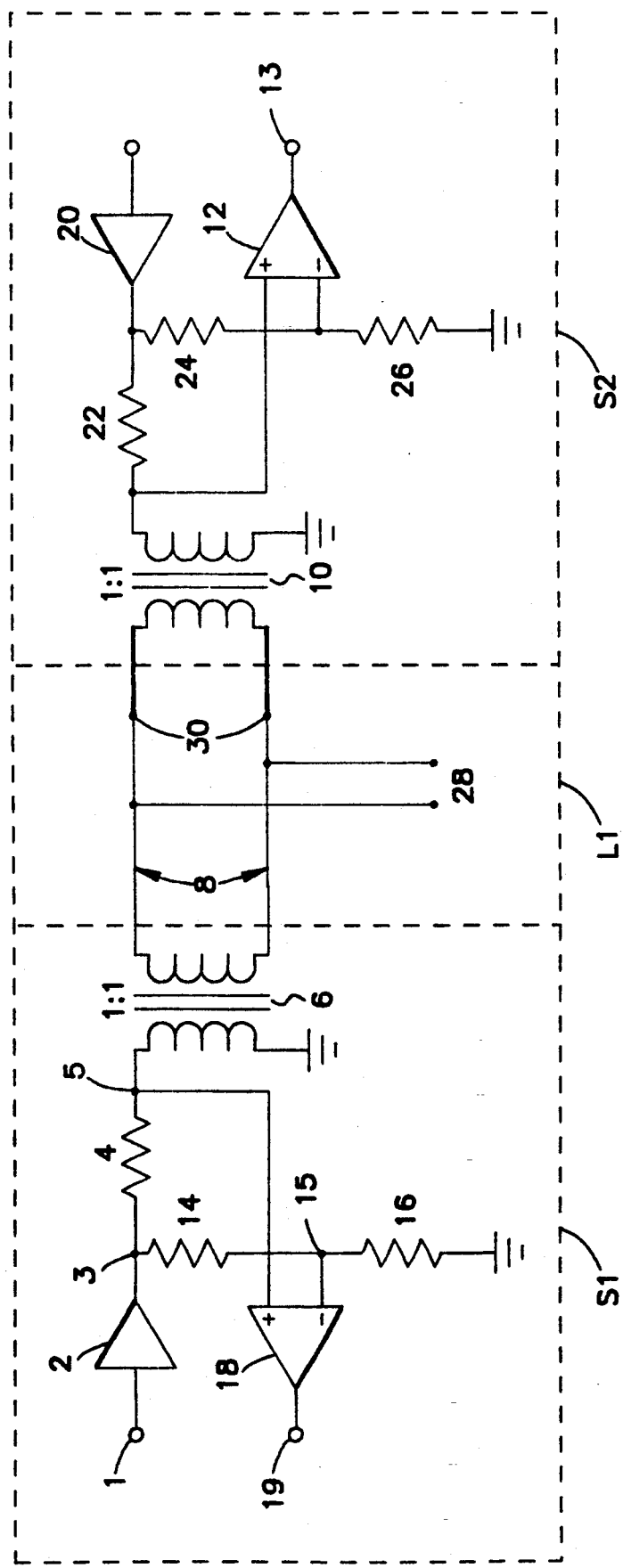
FIG. 1 is a simplified pictorial plan view of a basic two-wire, full duplex transmission scheme including a method of removing the transmitted signal from the received signal.

Referring now to the drawings, wherein like reference numerals designate corresponding elements throughout the views, and particularly referring to FIG. 1, a simplified pictorial plan view of full duplex operation on a single twisted pair scheme, including a method of removing the transmitted signal from the receiver. Shown are three sections: first subscriber network S1, transmission line L1, and second subscriber network S2. First subscriber network S1 has an input signal applied on node 1 going to line driver 2. Line driver 2 conditions the input signal for transmission on transmission line L1 and outputs a signal to node 3. At node 3 the signal is applied to the primary side of transformer 6 via resistor 4 and is also applied to resistor 16 via resistor 14.

At the junction of transformer 6 and resistor 4 is node 5, which connects to the positive input of operational amplifier 18. Resistor 4 is ideally selected to be equal to the reflected line impedance from transformer 6 so that maximum power is transferred to transmission line L1. Ideally, the voltage at node 5 is then one-half of the voltage at node 3 when only subscriber network S1 is transmitting.

The junction of resistor 14 and resistor 16, ideally equal in value, forms node 15, which also connects to the negative input of operational amplifier 18. Therefore, the voltage at node 15 is ideally one-half the voltage at node 3.

With both the positive and negative inputs of operational amplifier 18 at one-half the voltage at node 3, operational amplifier 18 ideally has no output. However, when subscriber network S2 sends a signal to subscriber network S1, the signal is received at node 5. Operational amplifier 18 then has a voltage difference corresponding to the signal from subscriber network S2 between its positive and negative inputs. This voltage difference is amplified by the gain of operational amplifier 18 and is available at output 19 for use by the receiver of subscriber network S1.

Subscriber network S2, consisting of line driver 20, operational amplifier 12, resistor 22, resistor 24, resistor 26, and transformer 10, is identical to subscriber network S1. To simplify the disclosure, subscriber network S2 will not be discussed further unless required for understanding.

The ideal operation described above does not occur in actual operation. Mismatches between transmission line L1 an subscribers S1 and S2 create incident signals which eliminate the supposed perfect balance between the positive and negative inputs to operational amplifier 18. This mismatch is almost guaranteed to exist because the input impedance of transmission line L1 is not a pure resistance but is an impedance which creates phase shifts not cancellable by a simple resistor. Another problem is that transmission line L1 has numerous wire gauge changes 30 and various take-offs 28, otherwise known as "stubs" or "bridged taps" which cause reflections of the transmitted signal back to the sender. These problems are predominately linear functions of the transmitted signal, i.e. if the transmitted signal changes amplitude by a given amount, so do the echo components.

Line driver 2, however, is essentially a D/A converter which is nonlinear. If the transmitted signal changes, so will the output of line driver 2, except now the change in output of line driver 2 is a complex function of the change in the transmitted signal. Additionally, transformer 6 has a nonlinear hysteresis curve, particularly when it saturates. Therefore, even if the linear echo component is perfectly cancelled the output of operational amplifier 18 is not zero but is some value dependant on the transmitted signal magnitude. Because of these and other problems, the simple circuit shown in FIG. 1 is unsuitable for most data communications such as those encompassed by ANSI T1.601-1988.

The Accredited Standards Committee on Telecommunications, T1, submitted to the American National Standards Institute a standard for integrated services digital networking, ANSI T1.601-1988, entitled "Integrated Services Digital Network (ISDN)—Basic Access Interface for Use on Metallic Loops for Application on the Network Side of the NT (Layer 1 Specification)." This document describes a set of requirements and protocols for communication between subscribers when using full duplex operation on the existing single twisted wire pair phone line.

ANSI T1.601-1988 requires that transmitted information must be encoded using a code termed "2B1Q". 2B1Q is a pulse amplitude modulation code wherein two digital data bits are encoded into four levels: if the first bit is a 1 and the second bit is a 0,(10), a 2.5 volt signal is impressed on the line; if the first bit is a 1 and the second bit is a 1,(11), a 5/6th volt signal is impressed on the line; if the first bit is a 0 and the second is a 1,(01), a −5/6th volts is impressed on the line; finally, if the first bit is a 0 and the second bit is a 0, (00), a−2.5 volt signal is impressed on the line. These digital codes have a +3, +1, −1, −3, relationship. ANSI T1.601-1988 also requires that a transmission rate of 80,000 bauds per second must be used, corresponding to 160,000 bits per second because of the 2-bit per baud relationship.

Since a signal from one subscriber to another may be attenuated by transmission line L1 by as much as 40 db and since the transmitted signal's echo may be almost as large as the transmitted signal, the echoes must be very effectively cancelled. Indeed, proper operation of the phone line as a communication medium typically require that the residual echo, the echo remaining after the echo canceller has performed its function, be less than one millivolt. This dictates that to reliably receive the signal sent by another subscriber, the echo must be suppressed by a factor of approximately 60 db.

Figure 2A:
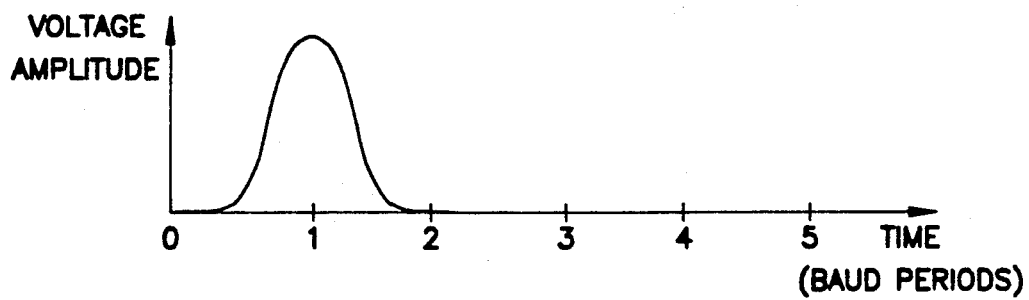
FIG. 2A–2C shows waveform representation of typical signals existing on a phone line when an apparatus using the ISDN protocol is attached to the line.
Figure 2B:
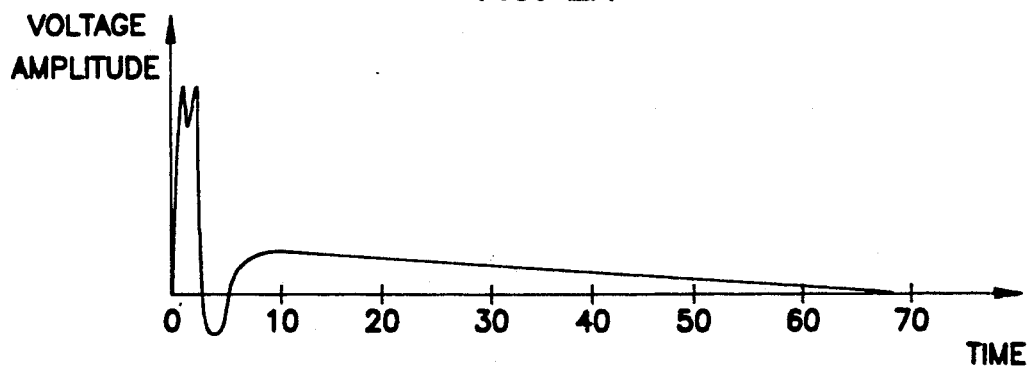
Figure 2C:
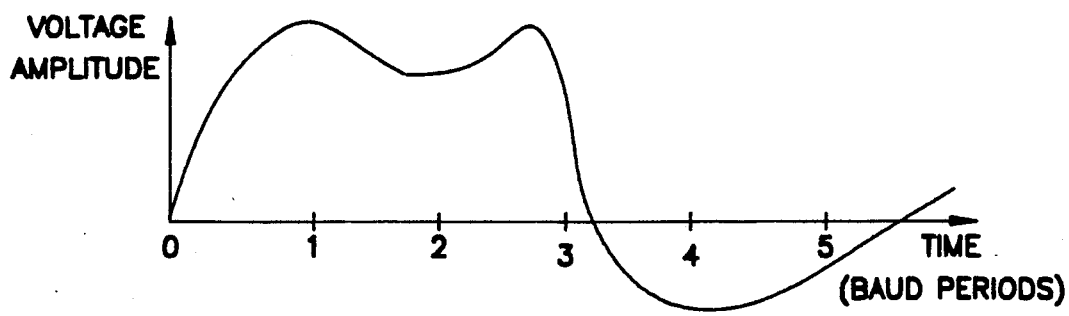

FIG. 2A–2C show typical transmitted waveforms and resulting reflected echo on a phone line when implementing an ISDN network. The time on the X axis is in baud periods. FIG. 2A shows a signal transmitted during a first baud period. The signal smoothly rises from time T0 to time T1, and then smoothly falls to time T2 thereby meeting the requirements of ANSI T1.601-1988, paragraph 5 et seq. This smooth rising curve reduces the impedance effects of the line by removing some of the high frequency components from the transmitted signal.

A typical transhybrid response is illustrated in FIG. 2B. As shown a transhybrid response lasts for a much longer time period than the transmitted signal. Additionally, as more easily seen in FIG. 2C, the early part of the response is quite large and variable, being of a peak amplitude approximately the size of the transmitted signal, dipping significantly at the second, third, and fourth baud periods, and rising again at the fifth baud period. This representation of transhybrid response is only typical, in practice the amplitudes may be large or small, may having many rises and dips, or none at all. In short, the early part of the transhybrid response is highly volatile.

However experimentation on actual twisted wire telephone lines and software simulations by the assignee of the present invention has shown that the latter part of the transhybrid response is quite "well behaved" and monotonically gets closer to zero as time runs, see FIG.

2B. "Well behaved" means that the response is similar to a response having one dominant simple pole.

A method of cancelling linear echo components using transversal filters is well known in the industry, see Kurt H. Mueller, *IEEE Transactions on Communications*, Sept. 1976, pp. 956–962. Linear echo cancelers of this type may be used in the present invention to cancel linear echo components. However, because in the present application the later parts of the transhybrid response are well behaved, the preferred embodiment uses the transversal filter based echo canceller described in co-pending U.S. Pat. application No. 07/507,593, filed Apr. 10, 1990.

In the application of the present invention, the high volatility in the early part of the transhybrid response shown in FIG. 2C is due, in part, to the nonlinear echo components. Experimentation by the assignee of the present invention has shown that the bulk of the nonlinear echo component to be concentrated in the first seven (7) baud periods.

FIG. 3A–3D detail the creation and effects of the nonlinearities and the resultant nonlinear echo component. FIG. 3A shows a typical transmitted signal pattern according to ANSI standards over a 5 baud time period. FIG. 3B shows the composite transfer function caused by various nonlinearities in the transmission path such as A/D conversion, D/A conversion, and hysteresis effects of the line transformer. The effect of the composite transfer function is that the transmitted signal is a complex function of the voltage level applied to the transmission path. This can be seen in FIG. 3C, which shows distortions and shifts from the voltage levels existing in FIG. 3A. Finally, FIG. 3D shows the nonlinear echo components caused by the nonlinearities in the transmission path. This nonlinear echo component is not cancellable by a transversal based echo canceller.

Figure 4:
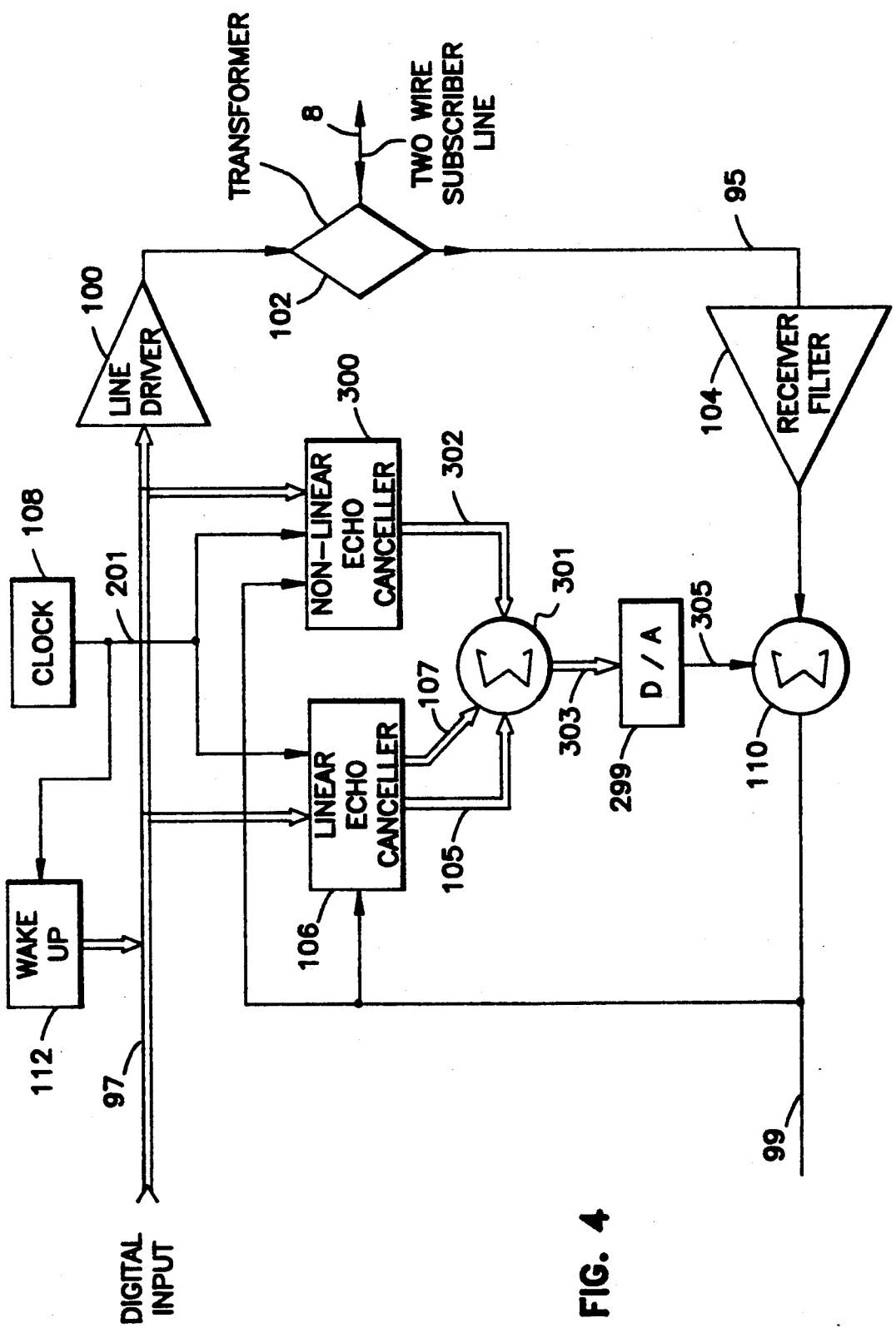
FIG. 4 is a block diagram of a transceiver portion of a two-wire, full duplex communication system incorporating the principles of the present invention which illustrates the spacial separation of the linear and nonlinear echo cancelers.

FIG. 4 shows a simplified block diagram of a transceiver illustrating the spatially separate echo canceller principle of the present invention. The actual implementation of the preferred embodiment is as a part of a highly complex chip set fabricated on a silicon substrate. To assist understanding of the present invention, the operation of FIG. 4 will be described immediately after communication between two subscribers has been implemented since at that time overall circuit operation lends itself to the most illuminating explanation.

Referring to FIG. 4, wake up circuit 112 applies a predetermined 2-bit wide digital pattern on bus 97 according to ANSI T1.601-1988 specifications. Since two subscriber stations are involved, one station does not transmit until the other stations initial echo cancellation is completed per ANSI T1.601-1988 specifications. The digital pattern on bus 97 is sent to line driver 100, a D/A converter for transforming the digital pattern to an analog signal corresponding to the specifications of ANSI T1.601-1988. Line driver 100 outputs the resultant analog signal to transformer 102, which couples the signal to the two-wire subscriber line 8.

The digital pattern is also applied via bus 97 to linear echo canceller 106 and nonlinear echo canceller 300. Additionally, clock signals from clock 108 go to wake up circuit 112, linear echo canceller 106, and nonlinear echo canceller 300. The clock signal is used to synchronize transceiver operation.

Since only one subscriber at a time is transmitting during wake up, the only signal received by receiver filter 104 is the transmitted signal from line driver 100 plus the echo components. The purpose of receiver filter 104 is to eliminate the effects of prior transmissions occurring earlier than the 60th prior baud period. The assignees of the present invention have found from experimentation on actual telephone lines and from software simulation that early parts of the transhybrid response when meeting the requirements of ANSI T1.601-1988 are "well behaved." Well behaved describes a function similar to one having a dominate single pole with a long time constant, which results in a function having a portion which changes monotonically in an exponential manner.

The earlier parts of the transhybrid response have a slender tail which exponentially decays in a manner that gets more and more predictable until, at some point, the response can be handled as a known quantity. This implies that at some point the transhybrid response can be assumed and not calculated. In the application of the preferred embodiment, the transhybrid response is calculated for the latest 60 data transmissions and assumed for all earlier transmissions. The assumed transhybrid response is eliminated by receiver filter 104 which subtracts the assumed amount of echo from the received signal and outputs the resulting filtered, received signal to summation network 110. For purposes of clarity, the output of receiver filter 104 will be referred to as the received signal and the operation of receiver filter 104 will not be discussed further.

Summation network 110 subtracts the outputs of the echo cancelers from the received signal, creating an echo cancelled signal on line 99 as described subsequently.

Linear echo canceller 106 uses the current transmitted digital pattern and 59 of the previous ones plus the echo cancelled signal on line 99 to create output signals on bus 105 and on bus 107 which are applied to summation network 301. When summed together in summation network 301 the signals on bus 105 and 107 correspond to the linear echo portion of the transhybrid response. Operation of linear echo canceller 106 is explained in co-pending U.S. Pat. application No. 07/507,593, filed Apr. 10, 1990. Similarly, nonlinear echo canceller 300 outputs a signal on bus 302 which corresponds to the nonlinear echo response to summation network 301. A more detailed operation of linear echo canceller 106 and nonlinear echo canceller 300 is given in the text below.

Summation network 301 sums together information on buses 105, 107 and 302. Since in the preferred embodiment this information is in digital form, the output of summation network 301 is applied on bus 303 to D/A (digital-to-analog) converter 299. D/A converter 299 converts the digital information on bus 303 to an analog signal which corresponds to the system transhybrid response.

The analog signal representation of the transhybrid response is applied via line 305 to summation network 110 which subtracts the transhybrid response from the received signal from receiver filter 104. Therefore, in a perfect circuit the echo cancelled signal on line 99 corresponds to the received signal minus the linear echo minus the nonlinear echo, leaving only the signal transmitted by the other subscriber. In reality, the output contains a residual echo that is small not to hinder communications.

As shown in FIG. 4, Linear echo canceller 106 and nonlinear echo canceller 300 are spatially separate. However, as shown in FIG. 6, in the preferred embodiment linear echo canceller 106 and nonlinear echo canceller 300 share a common shift register so that the overall implementation is simplified. Nonetheless, separate shift registers are possible and the actual echo cancellation takes place in separate components, linear echo canceller 106 using a transversal filter and nonlinear echo canceller 300 using look up table memory. Because the information the echo cancelers are working on is the same, sharing a data storage means is prudent.

Figure 5:
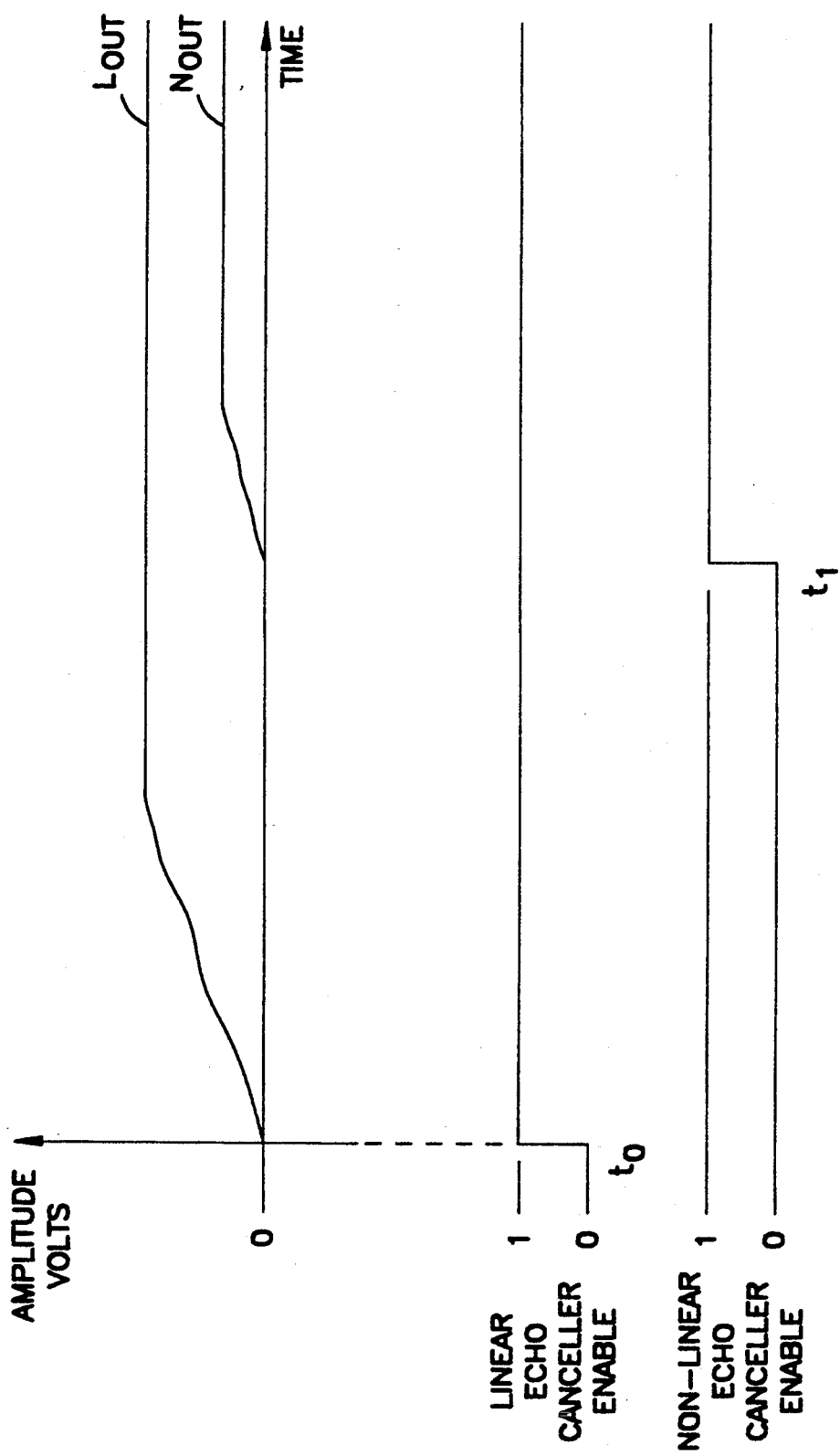
FIG. 5 is a timing diagram which shows the temporal separation of typical linear and nonlinear coefficient adjust signals according to the principles of the present invention.

According to the principles of the present invention, adjustments of the echo cancelers occur at different times. Please refer to FIGS. 4 and 5 in the following discussion. At a time $T_0$, wake up circuit 112 enables linear echo canceller 106, but not nonlinear echo canceller 300, and begins generating digital patterns. Linear echo canceller 106 begins adjusting its output, $L_{out}$ in FIG. 5. After a time sufficient for linear echo canceller 106 to cancel all of the linear echo components on line 99 (full linear convergence), $t_1''$ occurs and nonlinear echo canceller 300 begins cancel the nonlinear echo component, $N_{out}$, shown in FIG. 5. After the nonlinear echo canceller has adjusted its output to cancel the nonlinear echo component (full nonlinear convergence) the overall system begins operating. This temporal separation prevents nonlinear echo canceller 300 from attempting to cancel the linear echo component which could cause convergence problems. Wake up circuit 112 no longer controls operation of the transceiver and digital information to be sent to the other subscriber is applied to bus 97 of FIG. 4.

Since phone line conditions can change over time the preferred embodiment of the present invention continuously updates the echo cancellation. On each transmitted signal, both linear echo canceller 106 and nonlinear echo canceller 300 begin to adjust their outputs to cancel the echoes. However, linear echo canceller 106 operates much faster then nonlinear echo canceller 300 and achieves full linear convergence before nonlinear echo canceller 300 can complete its operation. Therefore, nonlinear echo canceller 300 effectively only adjusts the nonlinear echo component.

Figure 6A:
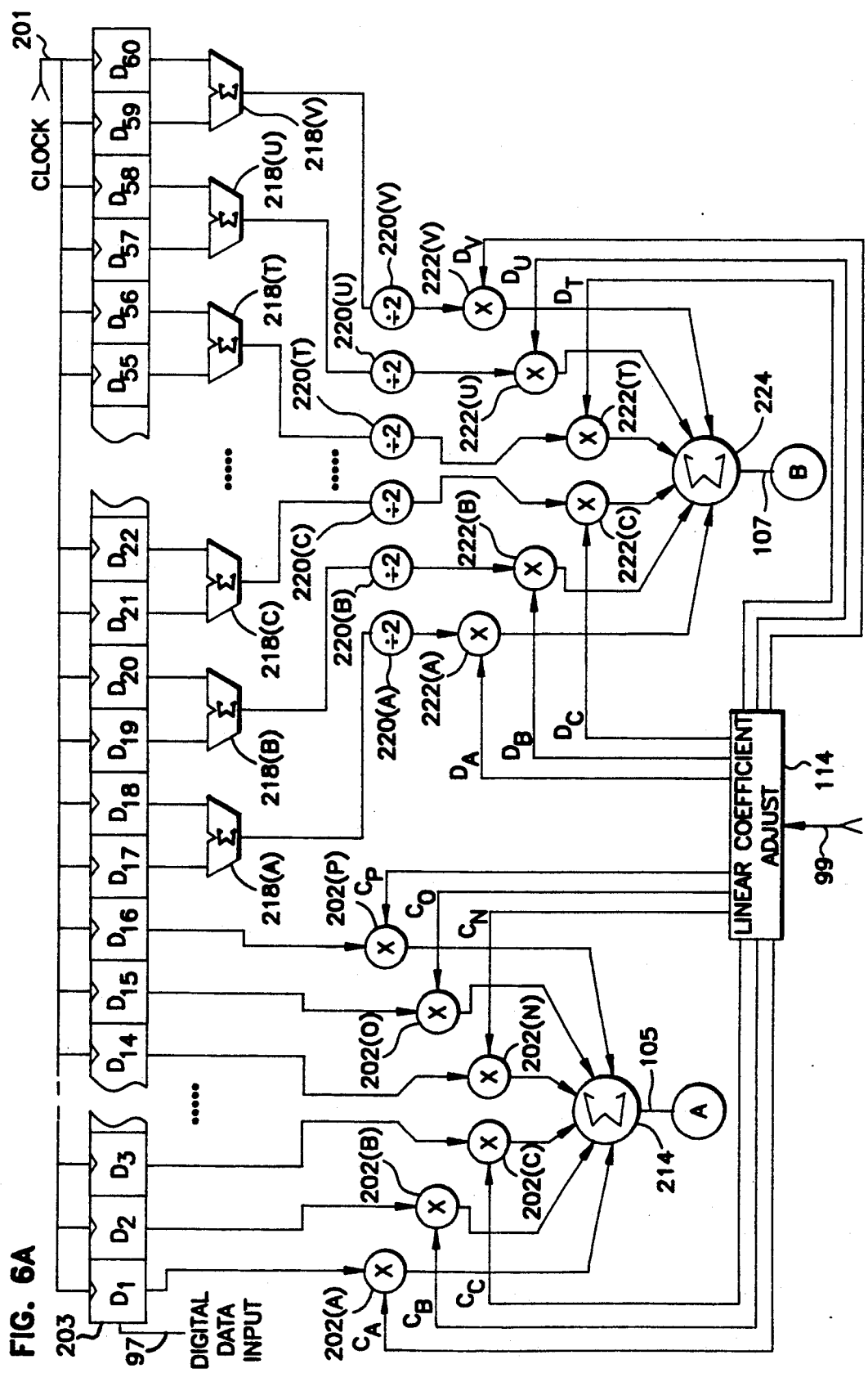
FIGS. 6A and 6B are simplified schematic block diagrams of a complete echo canceller according to the preferred embodiment of the present invention showing a transversal filter based linear echo canceller with tail cancellation and a RAM based nonlinear echo canceller.
Figure 6B:
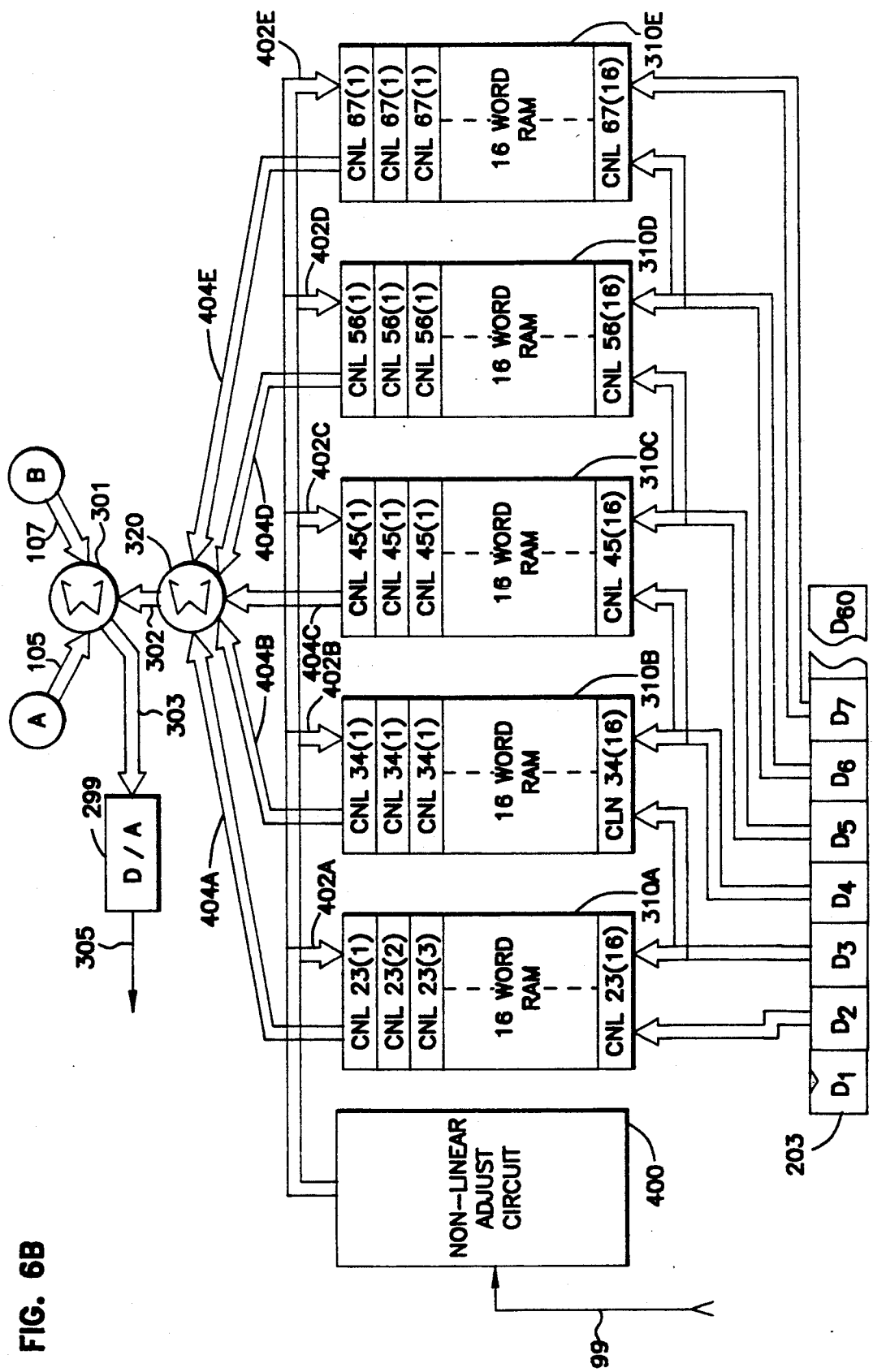

FIG. 6A and 6B show simplified schematic block diagrams of the preferred embodiment of the present invention. Digital patterns, whether from wake up circuit 112 or from a digital input, are applied to shift register 203 via bus 97. In the preferred embodiment of the present invention shift register 203 has 60 registers. These registers store the present transmitted pattern and the previous 59. However, the present invention specifically contemplates any plurality of registers.

In the present application the actual transmitted signal is an analog representation of two digital bits, therefore each register is capable of storing a two bit wide word. However, it is specifically contemplated that the present invention may be used with a transmitted signal that represents any number of digital bits. Shift register 203 sequentially stores the digital patterns under the control of a clock signal on line 201.

In the preferred embodiment of the present invention the digital patterns stored in the first 16 registers of shift register 200 are individually applied to individual multipliers 202(A)-202(P), corresponding to the present transmitted digital pattern and the previous 15. The transmitted patterns applied to multipliers 202(A)-202(P) are multiplied by coefficients CA, CB, CC, ... CM, CN, CO, CP respectively from linear coefficient adjust circuit 114. The output of multipliers 202(A)-202(P) are applied to summation network 214, which adds the various outputs and applies the total to bus 105. The purpose of linear coefficient adjust circuit 114 is discussed subsequently.

The patterns stored in the remaining registers of shift register 203 are handled differently from those in registers D1-D16. In the preferred embodiment of the present invention the patterns stored in adjacent pairs of registers are averaged together and then the resultant averaged value is applied to a multiplier. This is accomplished by connecting the digital patterns in registers D17 and D18 to adder 218(A), the digital patterns in registers D19 and D20 to adder 218(B), and so on until the digital patterns in registers D59 and D60 are applied to adder 218(V). Adders 218(A-218(V) add their individual inputs and apply their totals to dividers 220(A)-220(V), respectively. Dividers 220(A)-220(V) divide their inputs by two and outputs their resultants to multipliers 222(A)-222(V), respectively. Multipliers 222(A)-222(V) multiply their inputs coefficients DA, DB, DC, ... DT, DU, and DV, respectively by gain coefficients from linear coefficient adjust circuit 114. The output of multipliers 222(A)-222(V) are applied to summation network 224, which adds the various multiplier outputs and applies the total to bus 107.

The purpose of linear coefficient adjust circuit 114 is to adjust the output on buses 105 and 107 to correspond to the linear echo component. Linear coefficient adjust circuit 114 is connected to line 99. Prior to proper adjustment of the signals on buses 105 and 107, the linear echo output of summation network 110 is not cancelled, therefore coefficient adjust 114 has an input amplitude on line 99. Because transversal filter based echo cancelers are inherently incapable of cancelling nonlinear echoes, linear coefficient adjust circuit 114 begins changing the gain of the transversal filter multipliers in the direction of reducing the echo components on line 99. When the echo component on line 99 is minimized, full linear convergence is obtained. The signals on buses 105 and 107 are applied to summation network 301 as described previously. While the preferred embodiment of the present invention uses a transversal based linear echo canceller similar to that described in co-pending U.S. Pat. application No. 07/507,593, filed Apr. 10, 1990 other transversal filter based echo cancelers are specifically contemplated as usable in the present invention.

In the preferred embodiment, nonlinear echo canceller 300 includes RAMS 310A-310E. RAM 310A has address inputs connected to registers D2 and D3 of shift register 203. Similarly, as shown in FIG. 6, RAM 310B has address inputs connected to D3 and D4, RAM 310C has address inputs connected to registers D4 and D5, RAM 310D has address lines connected to registers D5 and D6, and RAM 310E has address lines connected to registers D6 and D7. Since each register of shift register 203 stores a 2 bit wide word, all RAMs have 4 address bits applied, allowing 16 memory locations to be addressed.

In the preferred embodiment, each memory location contains a 22-bit word that is a representation of the nonlinear echo component caused by a particular transmitted sequence. A 22-bit word is applied to each RAM by nonlinear adjust circuit 400 which has outputs 402A-402E connected to RAMs 310A-310E respectively. Additionally, nonlinear adjust circuit 400 has an input connected to line 99. During the wake up sequence, each of the possible transmitted sequences for data bits D2-D7 are actually transmitted. Since during wake up the other subscriber is not transmitting and, as described previously, the linear echo canceller has already achieved full linear convergence, the remaining echo on line 99 is the nonlinear echo component. For each transmitted sequence, nonlinear adjust circuit 400 monitors line 99 and checks the sign of the nonlinear echo component, either positive or negative. Assuming for the present discussion that it is positive, nonlinear adjust circuit 400 then starts counting upward and outputting a signal on bus 402A which increases the data bit stored in each of the memory locations. The echo canceller continues to operate, which reduces the nonlinear echo component on line 99 until such time as the nonlinear adjust circuit has stored the correct digital word to achieve maximum nonlinear echo cancellation in RAM 310A. Then if there is still a nonlinear echo component on line 99, nonlinear adjust circuit 400 starts increasing the data word stored in RAM 310B, attempting to reduce the nonlinear echo component further. This continues until nonlinear adjust circuit 400 has put the proper word in all memory locations to minimize the nonlinear echo component.

The nonlinear echo canceller has now achieved full nonlinear echo convergence. During normal operation the echo cancelers will continue to adjust. When a particular digital sequence has been transmitted, the linear echo canceller, as described above, converges rapidly to full linear convergence. Nonlinear adjust circuit 400 begins to change the word stored in each of the RAM memory locations until full nonlinear echo convergence is achieved. In this manner, the nonlinear echo canceller maintains its steady state nonlinear convergence and adjusts for varying conditions. In the preferred embodiment the linear and nonlinear echo cancelers operate simultaneously for a brief period of time. However, the linear echo canceller achieves full linear convergence rapidly enough so that the nonlinear echo canceller has only nominal impact on linear convergence. This is important because while a transversal filter based linear echo canceller cannot cancel nonlinear echoes, a memory based nonlinear canceller is effective in reducing linear echoes. Indeed, a memory table echo canceller can eliminate linear and nonlinear echoes simultaneously, but at a cost in speed and hardware if many baud periods must be handled.

Outputs of RAMs 310A–310E are applied to summation network 320 via buses 404A–404E, respectively. Summation network 320 adds all of the RAM outputs together, creating a composite digital representation of the nonlinear echo component, and applies it to bus 302.

Subsequent cancellation of the linear echo component on bus 105 and bus 107 and the nonlinear echo component on bus 302 was previously described above.

Generally, the present invention splits an echo canceller into separate linear and nonlinear echo cancelers that adjust their output in a fixed order with the linear echo canceller achieving full convergence prior to the nonlinear echo canceller achieving full nonlinear convergence. This permits cancellation of nonlinear echoes in a look up table having reduced memory requirements and faster operating times over that of a pure look-up table approach. Additionally, the order of echo cancellation adjustments avoids the problems of having two cancelers attempting to cancel an echo by adjusting in different directions and "fighting" each other.

It is to be understood, however, that even though numerous characteristics and advantages of the present invention have been set forth in the foregoing description, together with details of the structure and function of the invention, the disclosure is illustrative only, and changes may be made in details to the full extent indicated by the broad general meaning of the terms in which the appended claims are expressed.

What is claimed is:

1. A subscriber line circuit employing adaptive echo cancelling, comprising:
   (a) a wake up circuit for providing a predetermined N-bit wide digital pattern coupled to an input of a first digital to analog (D/A) converter having an output coupled to a line driver for converting the digital pattern to an analog signal, the line driver being coupled to a transformer for applying the analog signal to a subscriber line, the N-bit wide digital pattern also being coupled to inputs of a linear and a nonlinear echo canceller wherein both linear and nonlinear cancellers have outputs for providing echo cancelling signals;
   (b) means for selectively enabling the linear echo canceller by the wake up circuit at a predetermined time $t_0$ and means for selectively enabling the nonlinear echo canceller by the wake up circuit at a later predetermined time $t_1$, the time $t_1$ corresponding to a period of time when the linear echo canceller substantially reaches convergence;
   (c) a digital summation network having input means for summing the linear and nonlinear echo cancelling output signals and having an output for providing a digital composite sum;
   (d) a second digital to analog (D/A) circuit having an input coupled to the digital composite sum and having an output for providing a resultant analog signal;
   (e) a receiver filter having an input coupled through the transformer to the subscriber line for receiving signals from the subscriber line, the receiver filter having means for eradicating a residual echo signal occurring from prior baud transmissions on the subscriber line and output means for providing a filtered signal; and
   (f) an analog summation network having input means for summing the filtered signal from the output means of the receiver filter in a subtractive relation with the output of the second D/A converter, the output of the second D/A converter representative of echo cancelling signals, and the analog summation network having an output for providing received signals substantially free from echoes.

2. A subscriber line circuit as described in claim 1 wherein the echo cancelling signal provided by the linear echo canceller further includes a plurality of previously transmitted N-bit wide digital patterns.

3. A subscriber line circuit as recited in claim 1 wherein the linear echo canceller substantially achieves convergence and the linear and nonlinear echo cancellers both monitor a polarity of the residual echo signal and adjust a compensation signal in response thereto so as to minimize echo components.

4. A subscriber line circuit as described in claim 1 wherein a clock signal source is coupled to the wake up circuit, the linear echo canceller, and the nonlinear echo canceller to provide synchronization therebetween.

5. A subscriber line circuit as described in claim 1 wherein the linear echo canceller operates at a much faster speed than the nonlinear canceller so that the nonlinear echo canceller cancels only nonlinear echo components so as to avoid convergence problems between the linear and nonlinear echo cancellers.

6. An echo cancelling circuit in a subscriber line having linear and nonlinear echo canceller compensation, comprising:
   (a) shift register means comprising a first and a second concatenated group of registers for storing a plurality of data patterns;
   (b) first multiplying means for multiplying individual data patterns stored in each register of the first concatenated group of registers by individual linear coefficients;
   (c) first summing means, coupled to the first multiplying means, for providing an output sum of the first multiplying means and representative of a first linear echo cancelling sum;
   (d) averaging means for averaging data patterns adjacent each other in the second concatenated group of registers;
   (e) second multiplying means for multiplying the averaged data patterns by individual coefficients;
   (f) second summing means, coupled to the second multiplying means, for providing an output sum of the second multiplying means and representative of a second linear echo cancelling sum;
   (g) a plurality of random access memories (RAMS) having address input coupled to the shift register means and having data outputs coupled to a third summing means for providing a nonlinear echo cancelling sum; and
   (h) third summing means for summing together the first linear echo cancelling sum, the second linear echo cancelling sum and the nonlinear echo cancelling sum.

7. An echo cancelling circuit as recited in claim 6, further comprising a linear coefficient adjustment circuit for adapting the individual linear coefficients in elements (b) and (f).

8. An echo cancelling circuit as recited in claim 7, further comprising a nonlinear echo adjust circuit for simultaneously adjusting the plurality of the RAM's contents, the RAMs individually addressed by a plurality of previously transmitted N-bit wide digital patterns, the RAM's contents being representative of a nonlinear echo cancelling sum so as to reduce nonlinear echo effects.

9. A method in a subscriber line circuit for adaptive echo cancelling, comprising the steps of:
   (a) providing a predetermined N-bit wide digital pattern coupled to an input of a first digital to analog (D/A) converted having an output coupled to a line driver for converting the digital pattern to an analog signal;
   (b) coupling the line driver to a transformer for applying the analog signal to a subscriber line and coupling the N-bit wide digital pattern to a linear and a nonlinear echo canceller, both linear and nonlinear cancellers having output for providing echo cancelling signals;
   (c) selectively enabling the linear echo canceller at a predetermined time $t_0$ and enabling the nonlinear echo canceller at a later predetermined time $t_1$ to the subscriber line, the linear and nonlinear echo canceller operating concurrently thereafter, the time $t_1$ corresponding to a time from $t_0$ to wherein the linear echo canceller substantially reaches convergence;
   (d) digitally summing the linear and nonlinear echo cancelling output signals and providing a digital composite sum;
   (e) converting the digital composite sum to a resultant analog signal;
   (f) receiving signals from the subscriber line and eradicating a residual echo signal in the received signals occurring from prior baud transmissions on the subscriber line and thereby providing a filtered signal; and
   (g) summing the filtered signal in a subtractive relation with the resultant analog echo compensation signal.

10. A method as recited in claim 9 further comprising the step of including a plurality of previously transmitted N-bit wide digital patterns in the linear canceller output in step (b).

11. A method as recited in claim 10 further comprising the step of monitoring a polarity of the residual echo signal and adjusting the plurality of RAM contents, addressed by a previously transmitted N-bit wide digital pattern, in response thereto.

12. A method as recited in claim 9 further comprising the step of monitoring a polarity of the residual echo signal in step (f) and adjusting the outputs for providing echo cancelling signals in step (b) in response thereto, so as to minimize echo components.

13. A method as recited in claim 9 further comprising the step of synchronizing the linear echo canceller and the nonlinear echo canceller with a clock signal.

14. A method of as recited in claim 9 further comprising the step of operating the linear echo canceller at a much faster speed than the nonlinear canceller so that the nonlinear echo canceller cancels only nonlinear echo components to avoid convergence problems between the linear and nonlinear echo cancellers.

15. A method in a subscriber line for echo cancelling having linear and nonlinear echo canceller compensation, comprising the steps of:
   (a) storing a plurality of data patterns in a first concatenated register group;
   (b) multiplying individual data patterns stored in each register of the first concatenated group by individual linear coefficients to produce individual products;
   (c) summing the product of the individual data patterns and the individual linear coefficients to form a first linear echo cancelling sum;
   (d) averaging data patterns adjacent each other in a second concatenated group of registers, the averaged data patterns being multiplied by individual coefficients and summed to form a second linear echo cancelling sum;
   (e) coupling a plurality of random access memories (RAMS) address inputs to the first and second concatenated register groups and providing a nonlinear echo cancelling sum from the RAMS outputs; and
   (f) summing the first linear echo cancelling sum, the second linear echo cancelling sum and the nonlinear echo cancelling sum to form a composite echo cancelling compensation.

16. A method as recited in claim 15 further including the step of simultaneously adjusting the address inputs of the RAMS and the individual linear coefficients in steps (b) and (d) in response to a sensed polarity of a residual echo signal, so as to reduce echo effects.

17. A method as recited in claim 16, further comprising the step of selecting works in the RAMs by using a plurality of previously transmitted N-bit wide digital patterns to address the RAMs, and adjusting the selected words from the RAMs and the individual linear coefficients in steps (b) and (d) in response to a sensed polarity of a residual echo signal, so as to reduce echo effects.

* * * * *

UNITED STATES PATENT AND TRADEMARK OFFICE
CERTIFICATE OF CORRECTION

PATENT NO. : 5,148,427
DATED : September 15, 1992
INVENTOR(S) : Kenneth G. Buttle et al.

It is certified that error appears in the above-identified patent and that said Letters Patent is hereby corrected as shown below:

Column 2, line 57, "07/593" should read --07/507,593--. Column 4, line 26, "Fig. 2A-2C shows waveform representation" should read --Figs. 2A-2C show waveform representations--. Column 10, line 13, "(A" should read --(A)--; line 37, "The signals on buses" starts a new paragraph. Column 13, claim 9, line 47, "converted" should read --converter--; line 54, "output" should read --outputs--. Column 14, claim 14, line 25, after "method" strike "of"; line 61, "works" should read --words--.

Signed and Sealed this

Twenty-eighth Day of September, 1993

Attest:

BRUCE LEHMAN

Attesting Officer      Commissioner of Patents and Trademarks